Patented Sept. 8, 1953

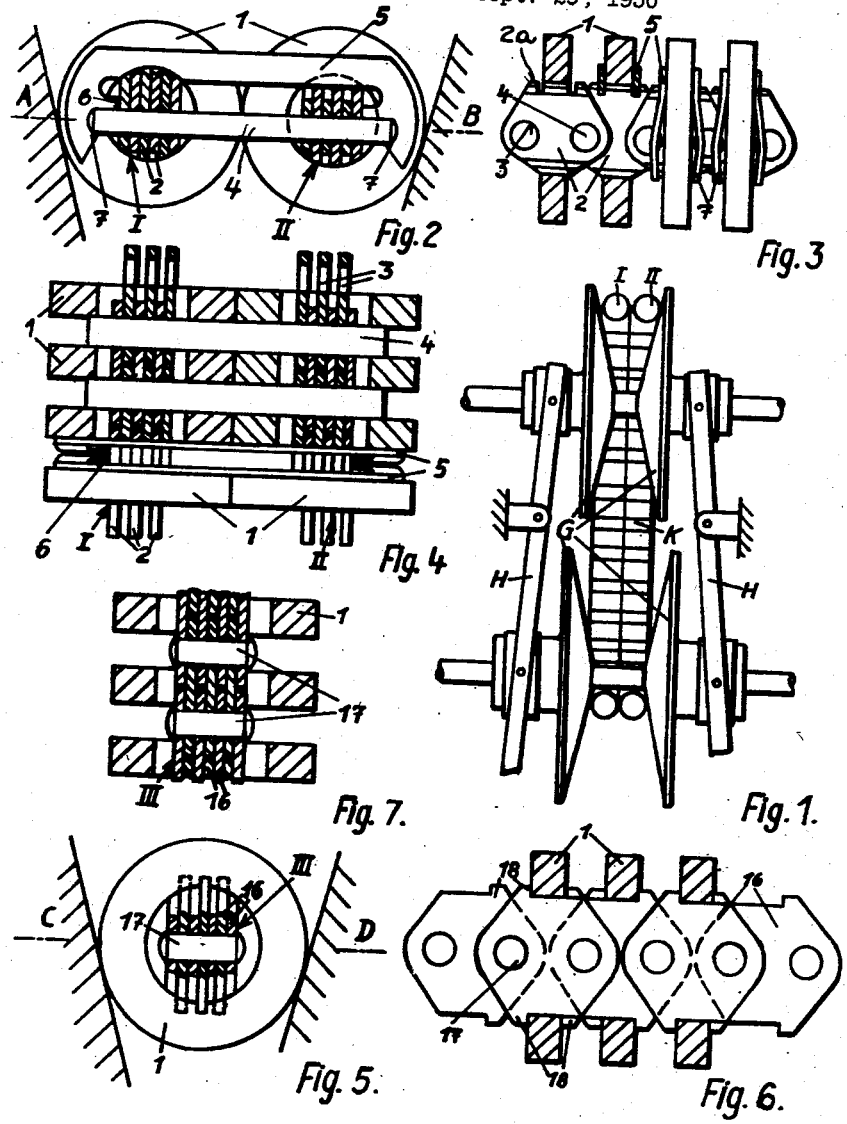

2,651,211

UNITED STATES PATENT OFFICE 2,651,211

TRANSMISSION CHAIN FOR V-TYPE PULLEYS

Erhardt Karig, Bad Homburg vor der Hohe, Germany, assignor to Patentverwertung W. Reimers, G. m. b. H., Bad Homburg vor der Hohe, Germany Application September 29, 1950, Serial No. 187,647
In Switzerland October 6, 1949

10 Claims. (Cl. 74—236)

Metal link-chains adapted to extend between V-type or so-called conical pulleys and provided with rollable pressure bodies arranged in pairs or multiples crosswise of the chain and rotatable about axes parallel to the direction of travel of the chain are already known in transmission mechanisms. In some of these chains, the pressure bodies (balls or rollers) are encased within the body of the chain and project beyond opposite lateral edges of the chain in such a manner as to frictionally grip the opposed conical faces of the pulleys.

Such chains in the past have been subject to the disadvantage that the pitch or thickness of the chain is a limiting factor upon the size of the pressure bodies that may be effectively used with the chain. Consequently, any increase in the size of the pressure bodies requires a corresponding increase in the pitch of the chain to accommodate the pressure bodies. Thus, whatever advantages that might be gained by using pressure bodies of larger size are more or less nullified by the necessity for making the chain of oversize pitch, and the greater the pitch, the fewer the links there are per unit length of chain, and consequently fewer pressure bodies come into engagement with the pulleys during the travel of the chain.

An important advantage of the chain of the present invention resides in the construction by which the pressure bodies are mounted, not within the chain, but in a manner such as to surround the links of the chain. That is to say, the pressure bodies are formed as rings which encircle the links of the chain and are rotatable about the latter. By virtue of this construction, the links composing the chain transmit the tensile load in a straight unweakened line from link to link, and the chain pitch and the size of the links may be reduced to a minimum. As another advantage, the diameter of the pressure rings may be optionally selected to best suit the conditions and purposes for which the chain is designed.

Another object of the invention is to provide a chain of the above character in which the chain is composed of two connected parallel-extending strands of links and the pressure rings are arranged in pairs upon the links crosswise of the chain with the rings in peripheral contact at points intermediate the width of the chain.

Still another object of the invention is to provide a chain composed of a single strand of links having pressure rings mounted thereon so as to completely encircle the chain. It has been found that such a chain having only a single ring-shaped body on each link presents considerable advantages. They reside more particularly in that the running circle radius of such a chain is mathematically exactly the same on both of the conical discs constituting a pulley, whereas with pressure bodies arranged in pairs different, if only slightly different, running circle radii on the oppositely disposed conical discs have to be reckoned with. As, moreover, single rings are able, while they are wedging themselves in, which action is combined with a tangential slip, to turn about their axes, always constant conditions of engagement result from the radii of the rings being independent of wear, to which may be added the constructional simplicity of the single-strand chain. As tests have shown, these advantages are so great that they more than counterbalance the disadvantage of the partial sliding in of the single rings between the conical discs, as compared with the pure rolling in of the double pressure bodies in the case of a two-strand chain. Further advantages will be gathered from the following description of the arrangement according to the invention.

The invention is illustrated in the accompanying drawings.

Figure 1 is a plan view of a variable speed transmission provided with a link-chain of the double-strand type, the chain being indicated schematically;

Figure 2 is a transverse cross-sectional view through the chain of Figure 1 showing one pair of pressure rings mounted thereon and indicating the manner in which the rings engage opposite conical discs of a V-pulley;

Figure 3 is a view, in part cross-sectional, of a section of chain viewed at right-angles to Figure 2, or parallel to a side edge of the chain;

Figure 4 is a view mainly in cross-section of the chain section taken on the line A—B of Figure 2;

Figure 5 is a transverse cross-sectional view through a chain of the single-strand type, showing the manner in which the pressure rings engage the conical discs of a pulley;

Figure 6 is an edge view of a section of chain corresponding to that of Figure 5, with the pressure rings shown in cross-section; and Figure 7 is view in cross-section of the chain section of Figure 6 but viewed from above or parallel to the upper face of the chain.

In Figure 1 of the drawing, is shown a variable speed transmission comprising two V-type pulleys, each provided with opposed conical discs G, an endless transmission chain K extending between the pulleys and levers H for adjusting the speed ratio of the transmission. The chain K comprises two parallel, longitudinally-extending strands I and II. Each strand is composed of a series of flat link plates 2 assembled in face-to-face relation with the plates of one row of plates longitudinally offset with respect to the plates of an adjacent row. The plates are punched adjacent their ends to provide eyes 3, two for each plate, through which freely pass link pins 4 for maintaining the link plates in interdigitated and articulated relation with the plates of one longitudinal row of plates projecting into the space between the plates of two adjacent rows of plates. While each link plate in effect constitutes a link element of the chain, however, for present purposes the several corresponding plates arranged in a row cross-wise of each strand of the chain and hinged upon two successive link pins 4 may be considered to constitute a link. Certain of the plates or all of them composing the cross-section of a strand of the chain constitute a running surface around which the inner peripheral surface of a roller can turn. If desired, a bearing ring for the roller ring (not shown) may also be placed around the link plates 2. Thus, the rings 1 encircle the chain links 2, turning loosely on them. The distances between the rollers in the direction of the chain length are fixed by link pins 4 passing through eyes 3 so as to extend laterally between and connect the two strands of the chain and these pins also transmit the forces from the rollers 1 to the link plates 2 and vice versa. For holding the pins 4 in place against axial displacement holders 5 are provided, which bridge across the upper face of the chain and bear against its opposite sides. These holders have a stirrup-like form with bent-away ends 7 for engaging the ends of the link pins 4, Figure 2, and have extensions 6 which bear against the outer sides of the plates. This arrangement serves two purposes. On the one hand, the pins 4 are prevented from shifting axially and, on the other hand, the stirrup 5 holds the chain strands together as a unit. Abutments for the rollers in the longitudinal direction of the chain are provided by ear-like projections 2a on the link plates, the ears of alternate link plates engaging, directly or indirectly, opposite sides of the pressure rings. The link pins 4 are capable of turning freely within the eyes 3 of the link plates, so as to utilise the entire peripheral surface of the pin for power transmission and thereby ensure uniform wear.

In Figures 5 to 7 a constructional form is shown, which has only a single tension strand. The tension strand III is constructed in substantially the same manner as the strands I or II above described, namely of link plates 16 and link pins 17 connecting them. The latter are loosely rotatable in the link plates and secured against falling out by being riveted over at their ends. The link plates 16 of each chain link form the support for a ring-shaped pressure body 1, the pressure rings bearing against ears 18 of the plates 16, which transmit from the rings to the chain the forces acting in the longitudinal direction of the chain.

I claim:

1. In a transmission chain adapted for use with V-type pulleys, the combination comprising a series of links connected in articulated relation, a plurality of pressure rings encircling the links at spaced distances lengthwise of the chain and free to rotate upon said links about axes substantially parallel to the length of the chain and means for preventing displacement of said rings in a direction lengthwise of the chain.

2. In a transmission chain adapted for use with V-type pulleys, the combination comprising a series of links connected in articulated relation, a plurality of pressure rings encircling the links at spaced distances lengthwise of the chain and free to rotate upon said links about axes substantially parallel to the length of the chain and abutments upon the chain for preventing displacement of said rings in a direction lengthwise of the chain.

3. In a transmission chain adapted for use with V-type pulleys, the combination comprising a series of links connected in articulated relation, said links each comprising a plurality of link plates assembled in side-by-side relation with certain of the plates of one link interdigitated with the plates of a succeeding link, a plurality of pressure rings including the links at spaced distances lengthwise of the chain and free to rotate upon said links about axes substantially parallel to the length of the chain and means carried by the chain for preventing displacement of said rings in a direction lengthwise of the chain.

4. In a transmission chain adapted for use with V-type pulleys, the combination comprising a series of links connected in articulated relation, said links each comprising a plurality of link plates assembled in side-by-side relation with certain of the plates of one link interdigitated with the plates of a succeeding link, a plurality of pressure rings encircling the links at spaced distances lengthwise of the chain and free to rotate upon said links about axes substantially parallel to the length of the chain and ears carried by the links for preventing displacement of said rings in a direction lengthwise of the chain.

5. In a transmission chain of the single-strand type adapted for use with V-type pulleys, the combination comprising a series of links connected in articulated relation, a plurality of pressure rings encircling the links at spaced distances lengthwise of the chain and free to rotate upon said links about axes substantially medially and parallel to the length of the chain with the circumferences of the rings projecting laterally beyond opposite sides of the chain for pulley engagement and means for preventing displacement of said rings in a direction lengthwise of the chain.

6. In a transmission chain of the single-strand type adapted for use with V-type pulleys, the combination comprising a series of links connected in articulated relation, a single pressure ring encircling each link and free to rotate upon said link about an axis substantially medially and parallel to the length of the chain with the circumference of the ring projecting laterally beyond opposite edges of the chain for pulley engagement and means carried by the chain for preventing displacement of said ring in a direction lengthwise of the chain.

7. In a transmission chain of the single-strand type adapted for use with V-type pulleys, the combination comprising a series of links connected in articulated relation, each of said links comprising a plurality of link plates assembled in side-by-side relation with certain of the plates of one link interdigitated with the plates of a succeeding link, a plurality of pressure rings encircling the links at spaced distances lengthwise of the chain and free to rotate about axes substantially medially and parallel to the length of the chain with the circumferences of the rings projecting laterally beyond opposite edges of the chain for pulley engagement and abutments upon the plates with the abutment on one link engaging one side of a ring and the abutment on a laterally adjacent plate engaging the other side of said ring, said abutments together preventing displacement of said ring in a direction lengthwise of the chain.

8. In a transmission chain adapted for use with V-type pulleys, the combination comprising a plurality of laterally-spaced strands each including a longitudinal series of links connected together in articulated relation, means connecting the strands for unitary movement, a plurality of pressure rings encircling the links of said strands at spaced distances lengthwise of the chain and free to rotate upon said links about axes substantially parallel to the length of the chain and means carried by the chain for preventing displacement of said rings in a direction lengthwise of the chain.

9. In a transmission chain adapted for use with V-type pulleys, the combination comprising a plurality of laterally-spaced strands each including a longitudinal series of links, link pins connecting the links in articulated relation and extending between and connecting the strands for unitary movement, and a plurality of pressure rings encircling the links of the strands at spaced distances lengthwise of the chain and free to rotate upon said links about axes substantially parallel to the length of the chain.

10. In a transmission chain adapted for use with V-type pulleys, the combination comprising a plurality of laterally-spaced strands each including a longitudinal series of links, said links each comprising a plurality of link plates assembled in side-by-side relation with certain of the plates of one link interdigitated with the plates of a succeeding link, link pins connecting the links in articulated relation and extending between and connecting the strands for unitary movement, a plurality of pressure rings encircling the links of the strands at spaced distances lengthwise of the chain and free to rotate upon said links about axes substantially parallel to the length of the chain, the rings correspondingly located lengthwise of the chain being in peripheral contact at points located intermediate the strands, and said link pins having extended ends providing abutments for preventing displacement of the rings in a direction lengthwise of the chain, and stirrups bridging the chain and engaging the sides of the links and the ends of the link pins upon opposite edges of the chain.

ERHARDT KARIG.

References Cited in the file of this patent

UNITED STATES PATENTS

| Number | Name | Date |
|---|---|---|
| 2,073,846 | Maurer | Mar. 16, 1937 |
| 2,179,944 | Maurer | Nov. 14, 1939 |